Nov. 21, 1961     K. H. PITZER     3,009,747
BUSHING

Filed Nov. 23, 1956     3 Sheets-Sheet 1

INVENTOR.
KENNETH H. PITZER
BY
ATTORNEY.

Nov. 21, 1961　　　　K. H. PITZER　　　　3,009,747
BUSHING

Filed Nov. 23, 1956　　　　　　　　　　　　　　　　　　　3 Sheets-Sheet 2

INVENTOR.
KENNETH H. PITZER
BY Philip Subkow
ATTORNEY.

Nov. 21, 1961  K. H. PITZER  3,009,747
BUSHING

Filed Nov. 23, 1956  3 Sheets-Sheet 3

INVENTOR.
KENNETH H. PITZER
BY Philip Subens
ATTORNEY.

3,009,747
BUSHING
Kenneth H. Pitzer, Los Angeles, Calif., assignor, by direct and mesne assignments, to Paul Gross, Sherman Oaks, Calif.
Filed Nov. 23, 1956, Ser. No. 624,132
4 Claims. (Cl. 308—71)

This invention relates to a device for supporting or frictionally connecting journaled members, such as a shaft, rod or tube of any cross-sectional configuration to journals of any desired cross-sectional configuration by means of radially adjustable bushings positioned about the shaft or rod and within such journal. The contiguous surfaces of the bushing and journal are of like geometry, i.e., the journal mates with the exterior surface of the expansible bushing, and the interior surface of the expansible bushing and shaft are of like geometry, i.e., the interior surface of the bushing mates with the exterior contiguous surface of the rod, tube or shaft.

The bushing is composed of female and male ring elements which are formed so as to have mating wedge surfaces. The rings may be positioned circumambiently about the rod, tube or shaft and within the journal in which the rod, tube or shaft is positioned. The contiguous mating female and male ring elements are not connected together and throughout their length are unrestrained against expansion against the journal or contraction against the shaft, rod or tube about which they are placed.

The mating rings may be composed of a system of a single pair consisting of overlying female and underlying male wedge rings whose contiguous surfaces form an acute angle with the axis of the rings so that a longitudinal compressive thrust moves the female and male rings relative to each other. Preferably, however, for longer bushings, I may employ a plurality of such female and male mating rings positioned axially aligned to form an elongated bushing. When employing such a plurality of pairs of female and male mating ring elements, I prefer to employ the following arrangement of my elements. I may arrange them so that adjacent surfaces of the male ring elements move in a one-to-one ratio when a longitudinal axial force is transmitted to one of the adjacent male elements, while the complementary female ring elements are free to move radially and longitudinally to create the opposing radial expansion of the female ring element and the contraction of the male ring element, as will be more fully described below. I may, however, arrange the ring system so that the adjacent female ring elements move in the one-to-one relationship described above.

The ring elements of the system of rings may be in a preferred embodiment separate and individual split rings, having a conical surface on the internal surface of the female ring and on the external surface of the male ring. The rings may be slotted so that they are transformed into ring springs. However, depending on the elastic limit of the material of which the rings is made and the axial load imposed, they may be, if desired, strained beyond their elastic limit for permanent deformation, as will be described below.

Said ring elements are free to move with respect to each other in a longitudinal direction and each are altered in radial dimension on such longitudinal displacement. No restraining mechanical elements are connected between the mating rings or to either of the mating rings to restrain or constrain their longitudinal motion or radial expansion against the interior or exterior confining surfaces, the constraint being limited by frictional forces between the rings against the journal or shaft and the bending of the rings and the constraints at the ends of the bushing whereby the axial load is applied. Axial force applying means are provided to exert an axial compressive force against one or both ends of the bushing, to cause relative axial movement of the mating rings. As a result of this construction the rings may be readily assembled and disassembled. If the proper angle of taper is provided, and if the spring rings have not been deformed beyond their elastic limit, as described above, the rings will become individually free of each other, when the axial load is removed.

Where the ring elements are solid rings with a circumferentially positioned wedge surface the total variation of the radial dimension on application of a given axial compressive force depends on the tension elastic modulus of the material, the radial force inducing a hoop stress. When metal is employed to form the solid ring, the total movement of the rings longitudinally and radially are both of minute dimension, and such units will act in practical effect merely as ring wedges, without any substantial radial expansion or contraction of the rings. In contradistinction, by employing split rings according to my invention, the radial force necessary to compress the split ring or expand the split ring is merely that required to bend the ring to open or close the slot.

For many uses, the radial motion practically possible with solid rings is not sufficient. I avoid these limitations by employing instead of solid rings, split rings.

Due to the angle of taper of the wedge surfaces a radial component of the applied axial pressure is generated, to radially displace the female elements outwardly and radially displace the male element inwardly. If it is desired that the radial pressure be relieved when the longitudinal force is removed, the angle of taper should be sufficiently great so that the wedge surfaces may slide over each other when the longitudinal force is removed, without requiring auxiliary unloading devices to separate the rings. The greater the angle the larger is the ratio of the radial displacement to the longitudinal movement.

In the device of my invention since I may employ a plurality of rings, employing a plurality of pairs of mating surfaces, and thus, I may, even for long bushings, make the angle of the mating surfaces sufficiently large to permit the wedge surfaces to slide over each other, when the load inducing the longitudinal displacement is removed. This will permit all the mating ring elements to automatically separate in a direction opposite to the original longitudinal displacement. I thus make the angle greater than the angle of repose for the material and coefficient of friction of the wedge surfaces. If, however, it is desired to lock the rings in place, even when the longitudinal force is removed, i.e., so that the rings do not unload, the angle should be made less than the angle of repose. If the angle is made small enough, less than the angle of repose, the removal of the axial load which caused the initial displacement will not cause the elements to move longitudinally with respect to each other, i.e., unload. Giving effect to the above considerations an angle of 30° has been found suitable for most metallic materials and most applications where the angle is to be greater than the angle of repose. While theoretically the angle may be increased up to less than 90°, the force necessary to cause longitudinal displacement to cause any desired radial expansion increases greatly with the increase of the angle.

If it is desired that the ring elements take a permanent set in the bushing, I may use a longitudinal compressive force and employ material in the ring of sufficiently low yield point so that when the desired radial expansion or contraction of the rings is obtained the rings will take a permanent set against the journal or shaft, rod or tube, as the case may be.

In one form of the rings of my invention, I slit the aforementioned wedge rings longitudinally. The radial force thus causes the slit female ring to open and thus expand radially, or the male ring to close and contract radially. The longitudinal force necessary to cause a given radial variation is thus much reduced from that required for solid rings, and the radial motion practically possible is thus also much increased over that possible with solid rings for like magnitude of force application.

If it is desired to alter the radial dimension of both the ring elements, I may slit both, or if it is desired to vary the radial dimension of one of the ring elements more than the other cooperating element, I may slit only the one which it is desired to alter in radial dimension in an amount greater than that of the other element. Thus the slit element may act as a spring if the bending force does not exceed the elastic limit of the ring while the contiguous ring acts as an abutting wedge member which is relatively radially rigid.

When only two wedge rings are employed to fill the space between the shaft and the journal the above considerations limit the ratio of the thickness of the bushing wall to the length of the bushing. Thus, practical considerations limit the length and thickness of each element if the angle is limited by the angle of repose and the angle required by the force applying means to overcome the friction. Thus, if it is desired that the rings may be unloaded, auxiliary unloading devices must be used when the ratio of the thickness of the bushing to its length is less than the tangent of the angle of repose. Alternatively, also, if it is desired that the angle be greater than the angle of repose a limitation is thus imposed on the ratio of length to thickness of the bushing. Furthermore, if the length be made large so that the bushing space be filled by two mating wedge rings, the radial pressure, i.e., the radial loading, will vary substantially along its length. Due to the fact that machining tolerances result in surfaces that are not true geometric surfaces without excessive precautions, equal fits over the entire length of the rings, journals and shafts do not occur. If the rings be made excessively long unequal radial loads will be imposed along the length of the rings.

By employing a plurality of such rings each substantially less in length than is the length of the bushing, the inequality in fit of each ring along the length of each ring is reduced and a more uniform loading is obtained along the length of the bushing.

Since the radial expansion in a solid wedge ring creates a hoop stress, the resulting strain being a function of the area of the cross-section, the degree of radial expansion obtained will reduce at various planes as we proceed from the apex toward the opposite end of the wedge ring. Consequently, if the wedge ring has any appreciable length measured in the direction along the ring axis a substantial variation in radial load will be obtained along the ring axis. This will be true in the case of the split rings but in a much less degree since the bending stresses which are introduced by the radial loading in the case of my invention are much less dependent on sectional area than are the hoop stresses in a solid ring. Additionally, by segmenting the bushing by employing a series of ring systems as described above, to form the expansible bushing of my invention, I may limit the variation in radial pressure, and also repeat the variation a number of times along the bushing, thus establishing a plurality of areas of maximum stress spaced uniformly along the length of the bushing.

The rings are so mounted that they may expand uniformly along their length, that is, there are no end constraints or constraints between the rings to limit the free and uniform expansion of the individual rings of the bushing against the journal or bearing or against the shaft.

By employing split rings instead of solid rings, I may control the degree of radial force exerted on the journal and shaft and wedge surfaces, since the degree of radial expansion on application of a longitudinally directed force will be greater in the case of the spring than is obtainable with solid ring wedges. Thus, the fit may be made to vary from that comparable to a shrink fit to a loose fit, and the degree of radial pressure may be varied between these limits selectively by the magnitude of the longitudinal force exerted on the longitudinally movable element.

Another advantage of the employment of split ring wedges arises from the fact that the shaft may be lubricated by applying lubricant to the exterior rings since I may provide a passageway for the lubricant via the spaces between the external rings and the slots in the external ring and the slots in the internal ring for admission of lubricant to the frictionally engaged surfaces where capillarity will distribute the lubricant between such surfaces.

The bushings of my invention have many uses. They may be used to provide bearings whose wall thickness may be adjusted on installation and varied thereafter to provide for wear. It may be used in an application where it would provide a variety of tightness or looseness of fits as desired. Because I may regulate the degree of frictional engagement between the elements and between the elements and the shaft and journal, I may employ the bushing of my invention either as a clutch or as a brake. I may also employ the bushing as a lock to make a tight frictional engagement between a journal and a shaft, which may approach a shrink fit. Wherever in the claims I employ the term "bushing" I mean to include the expansible or contractable ring assemblies of my invention, in whatever arrangement, between a member passing through or supported in or gripped by the contractable inner member of my ring assembly and a member against which the expansible outer ring element expands radially. The term "shaft" as employed in the claims is included to apply generally to such members and the term "journal," "housing" or "journal housing" is intended to apply to any form of member against which the outer ring expands radially.

These and other objects of my invention will be understood by reference to the following description of my invention together with the figures, of which:

Figure 1:
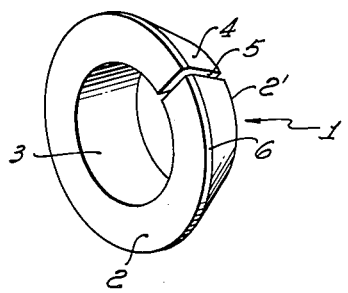
FIG. 1 is a perspective of one ring element of my invention.
Figure 5:
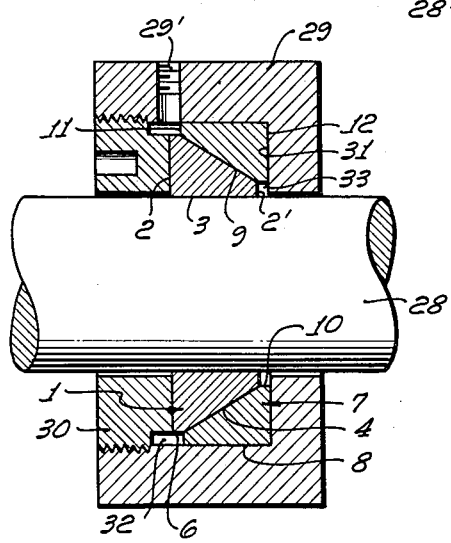
FIG. 5 is a section through one combination of the rings of my invention.

In FIG. 1 is shown in perspective and shown in section in FIG. 5, the cylindro-conical ring 1 in the form of a frustrum yielding a cylindro-frustroconical inner surface having plane annular bases 2 and 2', the conical surface being truncated at the opposite end to form the parallel ends perpendicular to the axis of the ring 1 whose cylindrical surface is uninterrupted except for a slit 5 and a cylindrical internal surface 3 perpendicular to the base 2 and an external surface composed of a conical surface 4 and a contiguous and cylindrical surface 6 which is parallel to the axis of the ring. The generating lines of the conical surface 4 make an acute angle termed the conical angle with the axis of the ring; this angle being more or less than the angle of repose of the ring, as will be clear from the foregoing. The ring may be slit by a slot 5, which intersects the exterior surface 4 and interior surface 3 of the ring and which may be parallel to the axis of the ring or at an angle thereto. The purpose is to convert the ring from a solid ring with substantially no compliance to a spring which yields in bending when a radial force is exerted against the interior cylindrical bore or the exterior conical surface of the ring and thus acts as a ring spring if the elastic limit is not exceeded.

Figure 2:
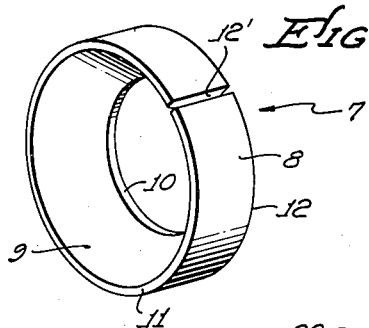
FIG. 2 is a perspective view of another ring element of my invention.

FIG. 2 shows in perspective and FIG. 5 shows in section a complementary ring 7 having an external cylindrical surface 8 uninterrupted except for the slit 12' and cylindro-conical inner surface in the form of a frustrum yielding a cylindro-frustroconical inner surface composed of a conical surface 9 and a cylindrical internal surface 10, and annular plane ends 11 and 12. The ring is split by a slot 12' which extends through the wall of the ring 12, similarly to that of the ring of FIG. 1. The angle made by the elements of the conical surface are the same as that of FIG. 1.

Figure 3:
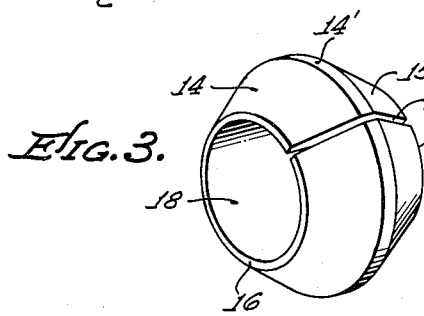
FIG. 3 is a perspective view of another ring element of my invention.
Figure 8:
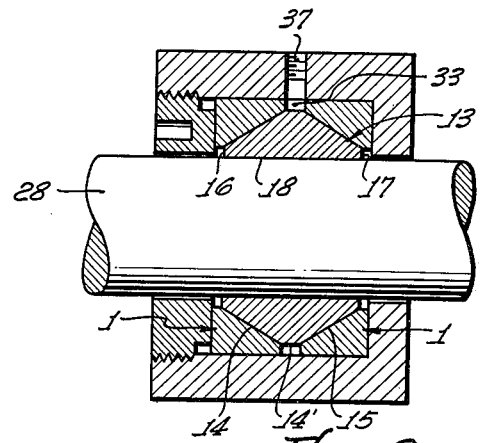
FIG. 8 is a section through another combination of the rings of my invention.

FIG. 3 shows in perspective and FIG. 8 shows in section a ring 13 which is double that of FIG. 1 with oppositely directed cylindro-frustroconical ends 14 and 15 making the same acute conical angles with the axis of the cylindrical bore 18 similar to that of the conical and cylindrical portions of the frustroconical surfaces of ring 1. The surfaces 14 and 15 are separated by a cylindrical surface 14' parallel to the axis of the bore 18 which surfaces are uninterrupted except for the slit 27 and the ring has cylindrical annular ends 16 and 17. The surfaces 14 and 15 make an angle with each other which may be either obtuse or acute, as will appear from this specification. The ring is slit by slot 19 through the wall of the ring similarly to rings 1 and 7.

Figure 4:
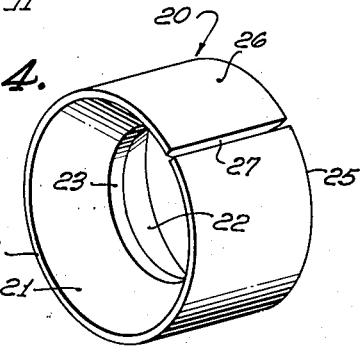
FIG. 4 is a perspective view of another ring element of my invention.
Figure 6:
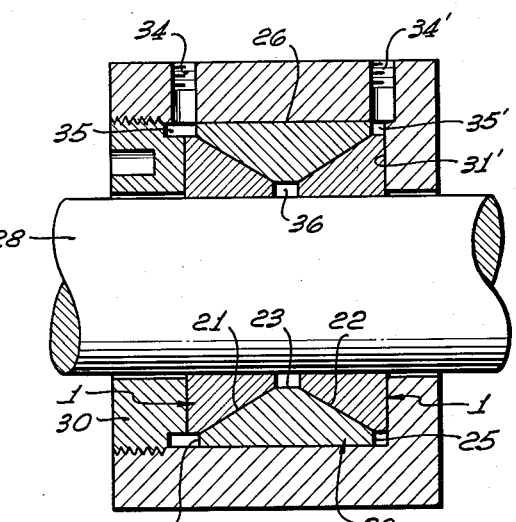
FIG. 6 is a section through another combination of the rings according to my invention.

FIG. 4 shows in perspective and FIG. 6 shows in section a ring 20 similar to ring 7 but essentially double the ring 7 with internal oppositely directed conical surfaces 21 and 22 separated by an inner cylindrical surface 23 and cylindrical annular ends 24 and 25 and a cylindrical outer surface 26. The acute angles of the conical bevel 21 and 22 are the same as in the rings 1 and 3. The ring is split by slot 27 similarly to the other rings.

While I have described the above rings as split, as I prefer them to be for some uses, one of the rings, i.e., either the male or female ring, may be a solid ring, i.e., not split, as will be described below.

In FIG. 5 is shown an assembly illustrative of the generic applicability of the bushing described in this specification to be interposed between a shaft 28 or similar machine element and a housing or journal, or other machine element 29. In this form I employ a pair of mating rings illustrated by the rings 1 and 7. The end 2 of the ring 1 abuts against the nut 30 and the end 12 of the ring 7 abuts against the abutment 31. It is clear that by screwing the nut in over the shaft 28 the ring 1 will be pushed into the ring 7, and a radial pressure will be generated to expand ring 7 and contact ring 1. It will be seen that the ratio of the length of the bushing to its width is limited by the permissible angle of the conical surfaces 4 and 9 which are of the same angle to the axis of the ring system and shaft and bushing.

When using solid rings in contradistinction to split rings the radial expansion or contraction possible by the allowable effort of the nut 30 is limited by the elasticity of the metal of the rings, as is evident, and the expansion will be very limited. Additionally, unless the contiguous surfaces are true fits an unequal expansion and contraction of the rings will occur along the length of the bushing. This introduces extreme limitations on the permissible tolerances.

By employing split rings the same axial pressure exerted by the nut 30 will cause a greater linear motion of the ring 1 and a greater radial expansion of the ring 7 and radial compression of the ring 1. The bushing may thus be used to fill an annular journal area to permit complete release of the engaging surface of the rings and one may obtain a wide variation of bearing pressure ranging from no bearing pressure to that where the metal of the rings 4 and 7 will yield. Thus, the bushing may be adjusted in wall thickness over wide limits much greater than when using a pair of solid rings.

It will be observed that there is no constraint between rings 1 and 7 or between the nut 30 and ring 1 or between abutment 31 and ring 7 or between 7 and 29, the exterior surface of 7 seating against the wall 29, so that the only retardation to motion is the friction against axial motion of the rings. This may be reduced by suitable lubrication. Thus, if desired a lubricating port 29' may be mounted on the housing 29 to register with the annular chamber 32 between the end 2 of the ring 1 and the complementary relieved face of the nut 30. This will provide means for introducing lubrication which will find its way via slot 12 of ring 7 and slot 5 of ring 1 to the annular chamber 33 between the end 2' of the ring 1 and the abutment 31 between the contiguous faces 4 and 9 and between the inner bore 3 of the ring 1 and the shaft 28 and between the face of the nut 30 and face 2 of ring 1 and between the face 12 of ring 7 and the abutment 31.

FIG. 6 shows a preferred orientation of rings which permits of a greater length of bushing and a more uniform distribution of load. In this arrangement the external ring is in the form of 20 (FIG. 4) and two oppositely directed male internal rings of the form of 1 (FIG. 1) are employed. Alternatively, as shown in FIG. 8, the internal ring may be of the form of 13 (FIG. 3) and the external rings of the form of 7 (FIG. 2). In the case of FIG. 6 combination, lubricating ports 34 may be placed to intercept the annular chamber 35 between the end 24 of the rings 20 and the relieved face of the nut 30 and a like port 34' may be provided to intercept the annular chamber 35' between the end 25 and the abutment 31' of the housing. Lubricant may be introduced through either port and find its way either under pressure or by capillarity via the slots 27 and 5 and the annular chamber 36 and the ends 2' of the adjacent rings 1 between the contiguous frictional surfaces. In the case of the form of FIG. 8 the lubricating port 33 is in register with the annular chamber between the ends 2' of the rings 1. Lubricant introduced via 37 will be distributed and lubricate the surfaces in a manner similarly to that described above.

Figure 7:
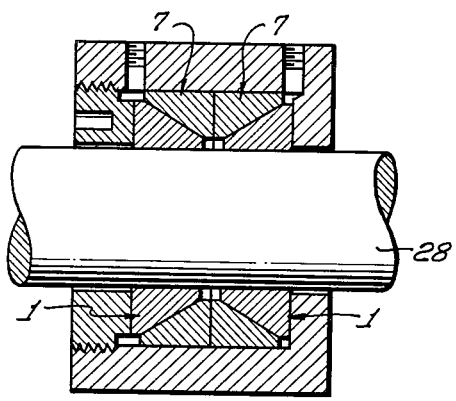
FIG. 7 is a section through another combination of the rings, according to my invention.

The form shown in FIG. 6 may be modified as shown in FIG. 7 by using two abutting rings 7 in place of ring 20. In all other respects the bushing is the same in construction and action.

Figure 9:
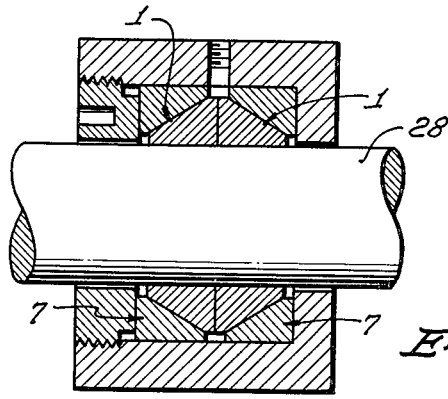
FIG. 9 is a section through another combination of the rings according to my invention.

In like manner, the bushing of FIG. 8 may be modified as shown in FIG. 9 by using two abutting rings 1 in place of ring 13.

It will be observed that in the form of FIG. 6, the thrust produced by the nut and the equal and reactive thrust produced by the abutment will result in equal but opposite longitudinal movement of the rings 1 and an equal distribution of radial compression in both sides of the plane bisecting the angle formed by the surfaces 21 and 22 of ring 20. The rings move axially in a one-to-one relationship.

This is equally true of the bushing in the form shown in FIG. 7 where the abutting rings 7 act in the same manner as the single ring 20.

A like effect is present in the form shown in FIGS. 8 and 9. There the thrust of the nut and the reactive thrust against the abutment cause a like axial displacement of the rings 7 and a uniform distribution of radial load in both sides of the plane bisecting the angle between the surfaces 14 and 15 of ring 13 of FIG. 8 and between the surfaces 4 of the abutting rings 1 of the form of FIG. 9.

It will be observed that the longitudinal motion of 20 imposed as a result of the axial load produced by the nut 30 results, because of the rigid abutment against the confining wall of the housing 29, in equal relative motion between the inner and outer rings, and thus an equal radial thrust on both sides of the plane bisecting the angles formed by surfaces 21 and 22 of ring 20 of FIG. 6.

Instead of both the outer and inner rings being split, as described above, one of the sets of rings may be solid, i.e., the male or female ring may be solid and the mating ring split. The solid ring may be in contact with one of the confining surfaces and the radial expansion is taken substantially entirely in the split ring. In such case the lubricating passageways described above will not permit lubricant to get through the wall of the solid ring. This, however, may not be important in some applications especially when the solid ring is made integral with the confining element, which, for example, is formed as part of the shaft or housing.

Figure 10:
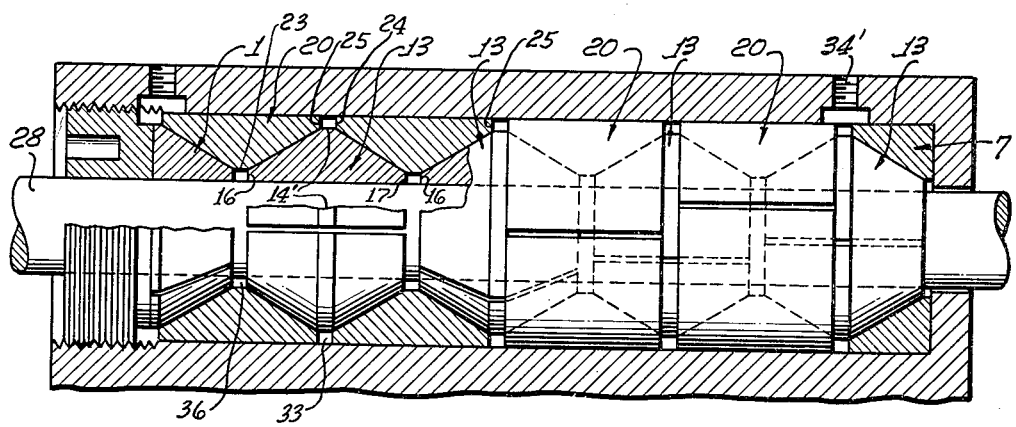
FIG. 10 is a section through another combination of rings according to my invention.

FIG. 10 shows a bushing made up of a multiplicity of split ring units 1, 7, 13 and 20, and illustrates how a bushing of any desired length may be set in a housing or journal.

As shown, the terminal ring against the bushing abutment is a ring of the form shown in FIG. 2. In such case the lubricating port 34' intercepts the annular chamber between the ring 7 and the adjacent ring 20. However, depending on the length of the bushing and the length of the rings 7, the terminal ring may be in the form shown in FIG. 1 and the mating ring of the form of ring 20. In such case the lubricating port is arranged adjacent the terminal ring in the manner shown in FIG. 7. In like manner, the ring against the nut may be of the form of 7 and the adjacent ring of the form of 13 in a manner similar to the arrangement of the initial ring system of FIG. 8. Reference to the figures and particularly FIG. 10 will show that the provision of the annular end surfaces 24 and 25 on the adjacent female rings and the spacing between the annular end surfaces 16 and 17 of the adjacent male rings permits of the longitudinal adjustment of the adjacent male rings and a like longitudinal adjustment of the female rings. This permits the female rings to approach each other over the distance between the adjacent female annular surfaces. This adjustment is further facilitated by the presence of the exterior cylindrical surface 14' of the male ring.

The provision of this cylindrical exterior surface 14' of the male ring in cooperation with the spaced annular surfaces 24 and 25 of the female ring also provide the chamber 33 described above. In like manner the provision of the interior cylindrical surface 23 in cooperation with the annular end surfaces 16 and 17 of the male rings form the chamber 36 described above.

Figure 11:
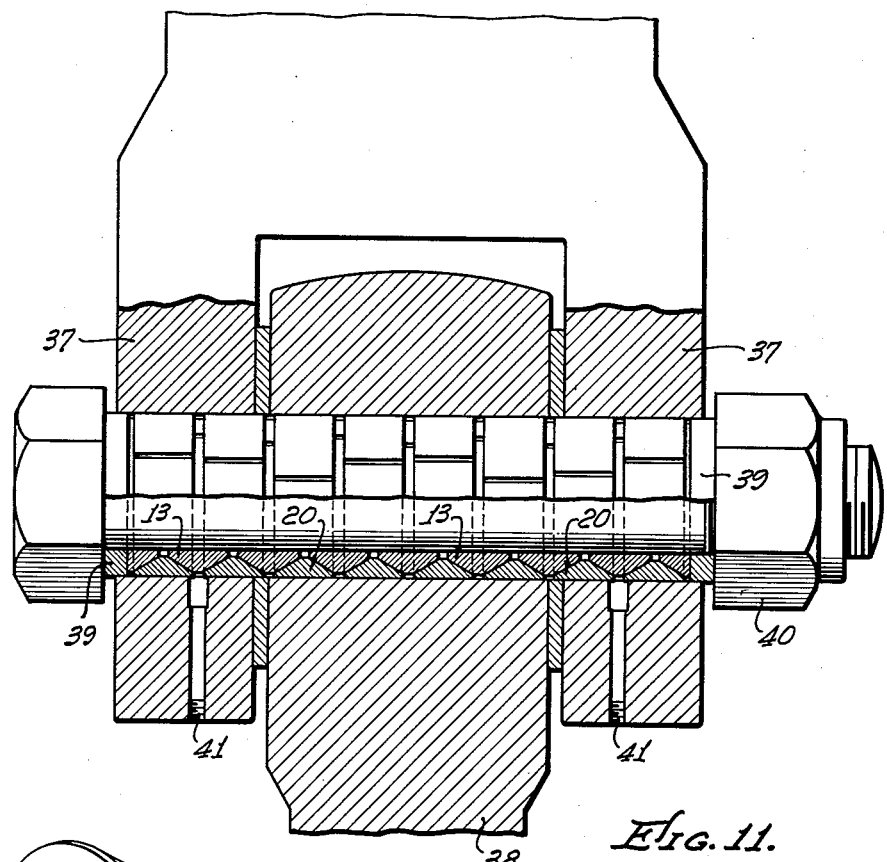
FIG. 11 is a section through an assembly showing one application of my invention.

FIG. 11 shows one application of such a bushing where the shaft 28 is a bolt which passes through the fork 37 and the lever 38 and the bushing assembly includes washers 39 having external bores equal to the bore of the yoke and lever mounted as shown to transmit the end thrust produced in the nut 40 to the rings. Lubricating ports may be provided with counterbores 41 to insure a lubricating passage into the spaces between the rings during their longitudinal displacement and into the slots so that it reaches the bolt and the journal surfaces.

Instead of a ring split at one point as shown in FIGS. 1 to 4, I may split them into two or more, or a plurality of arcuate ring segments. Thus, as is illustrated in FIGS. 12, 13, 14 and 15, the rings as shown in FIGS. 1 to 4, inclusive, are slit by three equally spaced slots 120° apart. The ring 1 may be slit at 5a, 5b and 5c as in the ring of FIG. 12 similar to slot 5 of FIG. 1. In like fashion I may slit ring 7 of FIG. 2 as shown in FIG 13 by three slots 12a, 12b and 12c all 120° apart. Ring 13 of FIG. 3 may be similarly slit by slots 19a, 19b and 19c all 120° apart. As shown in FIG. 14, ring 20 of FIG. 4 may be slit as shown in FIG. 15 by three slots 27a, 27b and 27c all 120° apart. The three arcuate ring segments may be employed in the same manner as the rings shown in FIGS. 1 to 4.

Figure 12:
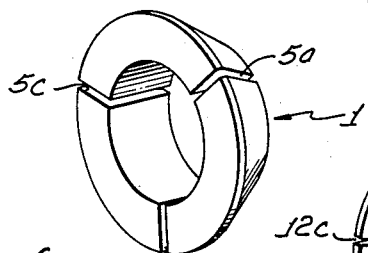
FIG. 12 is a perspective view of a modification of the ring of FIG. 1.
Figure 13:
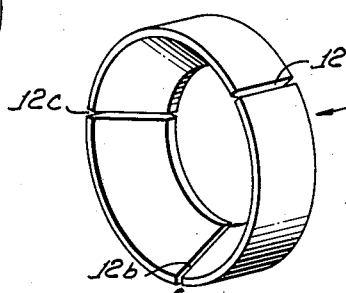
FIG. 13 is a perspective view of a modification of the ring of FIG. 2.
Figure 14:
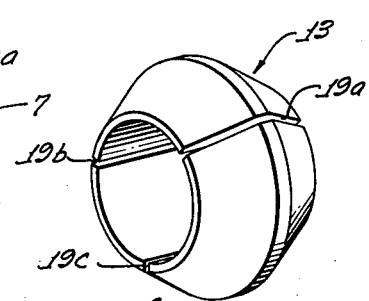
FIG. 14 is a perspective view of a modification of the ring of FIG. 3.
Figure 15:
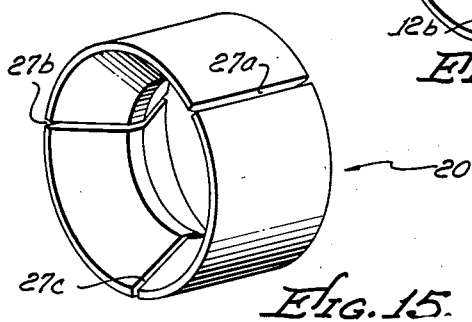
FIG. 15 is a modification of the ring of FIG. 4.

I may in each of the above forms employ, instead of the ring 1, the corresponding segmented ring of FIG. 12, and instead of the ring 7, the corresponding segmented ring of FIG. 13, and instead of ring 13, the corresponding segmented ring of FIG. 14, and instead of ring 20 the segmented ring of FIG. 15.

Upon axial displacement of the segmented male or female rings, the segments move radially as a body to have the effective ring diameter increased for the female segments and decreased for the male segments. Also, as in the case of the forms of FIGS. 1 to 4 they are radially deformed so that the radius of curvature of the female segments is increased to conform with the larger radius of the confining surface. In like manner the male segments are bent so that their radius of curvature is decreased to conform with the smaller radius of the shaft or other member which they support. Thus the radial dimensions of the rings in both the cases shown in FIGS. 1 to 4 and FIGS. 12 to 15 are altered as described above.

The rings of FIGS. 12, 13, 14 and 15 will bend and expand radially more easily than those of FIGS. 1, 2, 3 and 4 where they are of equal radii and cross section, and will thus be more easily deformed and will give a greater radial movement as compared with the forms shown in FIGS. 1 to 4 on like application of a force along the axis of the bushing.

Wherever I refer to a split ring, I mean to include a ring split at one or more places on its circumference and thus include segments of rings which may be placed around a circumference in ring formation, as illustrated in FIGS. 1 to 4 and in FIGS. 12 to 15.

While I have described a particular embodiment of my invention for the purpose of illustration, it should be understood that various modifications and adaptations thereof may be made within the spirit of the invention as set forth in the appended claims.

I claim:

1. A bushing assembly comprising a plurality of pairs of matching female and male circular spring rings positioned about a shaft in a cylindrical journal, said female rings of said pairs of rings having flat annular ends and an interior conical surface and an exterior cylindrical surface, said male rings of said pairs having flat annular ends and an exterior conical surface and an interior cylindrical surface, the conical surfaces of said rings being in wedging contact with each other, each of said rings being split by a slot extending entirely through the wall of said rings longitudinally of the axis of said rings, the exterior surface of said rings being otherwise uninterrupted, each of said rings of said pairs of rings being constructed and arranged for angular, longitudinal and radial movement relative to each other on said shaft and in said journal, and means for exerting a longitudinal compressing force on said rings to adjust the longitudinal and radial positions of said male and female rings by expanding the female rings and contracting the male rings.

2. In the bushing of claim 1, wherein said conical surfaces comprise oppositely directed ring wedge surfaces.

3. In the assembly of claim 1, wherein said conical surface of at least one of said female rings comprises oppositely directed ring wedge surfaces.

4. In the assembly of claim 1, wherein said conical surface of at least one of said male rings comprises oppositely directed ring wedge surfaces.

References Cited in the file of this patent

UNITED STATES PATENTS

| | | |
|---|---|---|
| 335,737 | Bedbury | Feb. 9, 1886 |
| 1,657,501 | Gregory | Jan. 31, 1928 |
| 1,741,183 | Carel | Dec. 31, 1929 |
| 1,998,728 | Marles | Apr. 23, 1935 |
| 2,244,734 | Severance | June 10, 1941 |
| 2,573,928 | Peter | Nov. 6, 1951 |
| 2,723,138 | Knudsen | Nov. 8, 1955 |
| 2,734,749 | Benjamin | Feb. 14, 1956 |

FOREIGN PATENTS

| | | |
|---|---|---|
| 1,854 | Great Britain | Feb. 9, 1886 |